US011960631B2

(12) United States Patent
Liu et al.

(10) Patent No.: US 11,960,631 B2
(45) Date of Patent: Apr. 16, 2024

(54) VEHICLE DIAGNOSIS METHOD, SERVER AND DIAGNOSIS DEVICE

(71) Applicant: LAUNCH TECH CO., LTD, Guangdong (CN)

(72) Inventors: Jun Liu, Guangdong (CN); Xiangmin Xu, Guangdong (CN); Liling Yan, Guangdong (CN)

(73) Assignee: LAUNCH TECH CO., LTD, Guangdong (CN)

( * ) Notice: Subject to any disclaimer, the term of this patent is extended or adjusted under 35 U.S.C. 154(b) by 452 days.

(21) Appl. No.: 17/283,258

(22) PCT Filed: May 29, 2020

(86) PCT No.: PCT/CN2020/093175
§ 371 (c)(1),
(2) Date: Apr. 7, 2021

(87) PCT Pub. No.: WO2021/237652
PCT Pub. Date: Dec. 2, 2021

(65) Prior Publication Data
US 2022/0188434 A1    Jun. 16, 2022

(51) Int. Cl.
G06F 21/62    (2013.01)
G06F 8/65    (2018.01)
G07C 5/00    (2006.01)

(52) U.S. Cl.
CPC .............. *G06F 21/629* (2013.01); *G06F 8/65* (2013.01); *G07C 5/008* (2013.01)

(58) Field of Classification Search
CPC .......... G06F 21/629; G06F 8/65; G06F 21/31; G06F 9/4451; G07C 5/008
See application file for complete search history.

(56) References Cited

U.S. PATENT DOCUMENTS 8,930,067 B1 * 1/2015 Green ................. H04W 12/084
705/7.41
2004/0203379 A1   10/2004 Witkowski et al.
(Continued)

FOREIGN PATENT DOCUMENTS

CN    104516345 A    4/2015
CN    109102591 A    12/2018
(Continued)

OTHER PUBLICATIONS

International Search Report for PCT/CN2020/093175 dated Feb. 8, 2021, ISA/CN.
(Continued)

*Primary Examiner* — Henry Tsang
(74) *Attorney, Agent, or Firm* — Yue (Robert) Xu; Apex Attorneys at Law, LLP

(57) ABSTRACT

A vehicle diagnosis method, a server and a diagnosis device are provided. The method includes: acquiring a request for acquiring diagnosis software sent by a diagnosis device, where the request comprises user information and vehicle information of a vehicle to be diagnosed; determining based on the vehicle information and sending to the diagnosis device a diagnosis software function module list, receiving from the diagnosis device information of the target diagnosis function module determined by a user; performing a corresponding operation for acquiring the target diagnosis function module based on a determining result of whether the user has an authorization qualification on the target diagnosis function module determined based on the user information and feeding back the target diagnosis function module to the diagnosis device, so that the diagnosis device to diagnose the vehicle to be diagnosed based on the acquired target diagnosis function module.

20 Claims, 5 Drawing Sheets

(56) References Cited

U.S. PATENT DOCUMENTS

2015/0094929 A1    4/2015  Bell
2017/0302452 A1   10/2017  Nanjundappa
2019/0371091 A1* 12/2019  Frisch .................. G07C 5/0808

FOREIGN PATENT DOCUMENTS

| CN | 109164783 A | * | 1/2019 | ......... G05B 23/0262 |
| CN | 109164783 A | | 1/2019 | |
| CN | 109491671 A | * | 3/2019 | ............... G06F 8/61 |
| CN | 109491671 A | | 3/2019 | |
| CN | 109740304 A | | 5/2019 | |

OTHER PUBLICATIONS

First Office Action dated Oct. 9, 2022 for Chinese patent application No. 202080001087.8, English translation provided by Global Dossier.

\* cited by examiner

VEHICLE DIAGNOSIS METHOD, SERVER AND DIAGNOSIS DEVICE

This application is a national phase of International Application No. PCT/CN2020/093175, titled "VEHICLE DIAGNOSIS METHOD, SERVER AND DIAGNOSIS DEVICE", filed on May 29, 2020, which is incorporated herein in its entirety.

FIELD

The present disclosure relates to the technical field of vehicle diagnosis, and in particular to a vehicle diagnosis method, a server and a diagnosis device.

BACKGROUND

In conventional technology, in vehicle fault diagnosis, determining and processing are performed by reading data of a vehicle electronic control unit by professional diagnosis software configured by a diagnosis device. However, the diagnosis software configured by the diagnosis device is generally configured by a diagnosis device manufacturer before delivery of the diagnosis device; or is acquired and used after the user gets the device. At present, a diagnosis software package configured by a diagnosis device is generally huge and basically includes a variety of diagnosis software of mainstream vehicle types. However, in a practical diagnosis process, only one or several diagnosis function modules in diagnosis software is required to implement vehicle diagnosis. Therefore, how to flexibly acquire and configure diagnosis function modules in vehicle diagnosis software to increase usage of diagnosis software and realize vehicle diagnosis is a problem required to be solved.

SUMMARY

An object of the present disclosure is to provide a vehicle diagnosis method, a server and a diagnosis device to configure a diagnosis device flexibly based on actual needs of a user to complete vehicle diagnosis, thereby improving usage of a diagnosis function module and realizing vehicle diagnosis. Specific solutions are as follows.

According to a first aspect of the present disclosure, a vehicle diagnosis method applied to a server is provided, including:

acquiring a request for acquiring diagnosis software sent by a diagnosis device based on a vehicle to be diagnosed, where the request includes user information and vehicle information of the vehicle to be diagnosed; determining a corresponding diagnosis software function module list based on the vehicle information; sending the diagnosis software function module list to the diagnosis device, so that the diagnosis device presents the diagnosis software function module list to a user, to cause the user to determine a target diagnosis function module; receiving from the diagnosis device information of the target diagnosis function module determined by the user; determining whether the user has an authorization qualification on the target diagnosis function module based on the user information to obtain a determining result; and performing a corresponding operation for acquiring the target diagnosis function module based on the determining result and feeding back the target diagnosis function module to the diagnosis device, so that the diagnosis device diagnoses the vehicle to be diagnosed based on the acquired target diagnosis function module.

According to a second aspect of the present disclosure, a vehicle diagnosis method applied to a diagnosis device is provided. The method includes: establishing a connection with a vehicle to be diagnosed and acquiring vehicle information; generating a request for acquiring diagnosis software based on a user instruction, where the request includes the vehicle information and user information; sending the request for acquiring the diagnosis software to a server to cause the server to determine a corresponding diagnosis software function module list based on the vehicle information; receiving the diagnosis software function module list and presenting the diagnosis software function module list to the user to cause the user to determine a target diagnosis function module; sending information of the target diagnosis function module to the server to cause the server to determine whether the user has an authorization qualification on the target diagnosis function module based on the user information and perform a corresponding operation for acquiring the target diagnosis function module based on a determining result; and receiving an operation result fed back by the server and diagnosing the vehicle to be diagnosed based on the acquired target diagnosis function module.

According to a third aspect of the present disclosure, a server is provided, including:

a memory configured to store an executable computer program and a processor configured to call the executable computer program to: acquire a request for acquiring diagnosis software sent by a diagnosis device based on a vehicle to be diagnosed, where the request includes user information and vehicle information of the vehicle to be diagnosed; determine a corresponding diagnosis software function module list based on the vehicle information, send the diagnosis software function module list to the diagnosis device, so that the diagnosis device presents the diagnosis software function module list to a user, to cause the user to determine a target diagnosis function module; receive from the diagnosis device information of the target diagnosis function module determined by the user; determine whether the user has an authorization qualification on the target diagnosis function module based on the user information to obtain a determining result; and perform a corresponding operation for acquiring the target diagnosis function module based on the determining result and feedback the target diagnosis function module to the diagnosis device, so that the diagnosis device diagnoses the vehicle to be diagnosed based on the acquired target diagnosis function module.

According to a fourth aspect of the present disclosure, a diagnosis device is provided, including a memory configured to store an executable computer program and a processor configured to call the executable computer program to: establish a connection with a vehicle to be diagnosed and acquire vehicle information; generate a request for acquiring diagnosis software based on a user instruction, where the request includes the vehicle information and user information; send the request for acquiring the diagnosis software to a server to cause the server to determine a corresponding diagnosis software function module list based on the vehicle information; receive the diagnosis software function module list and present the diagnosis software function module list to the user to cause the user to determine a target diagnosis function module; send information of the target diagnosis function module to the server to cause the server to determine whether the user has an authorization qualification on the target diagnosis function module based on the user information and perform a corresponding operation for acquiring the target diagnosis function module based on a determining result; and receive an operation result fed back by the server and diagnose the vehicle to be diagnosed based on the acquired target diagnosis function module.

A vehicle diagnosis method is provided according to the present disclosure. The method includes; acquiring a request for acquiring diagnosis software sent by a diagnosis device based on a vehicle to be diagnosed, where the request includes user information and vehicle information of the vehicle to be diagnosed; determining a corresponding diagnosis software function module list based on the vehicle information; sending the diagnosis software function module list to the diagnosis device to cause the diagnosis device to present the diagnosis software function module list to a user so as to cause the user to determine a target diagnosis function module; receiving from the diagnosis device information of the target diagnosis function module determined by the user; determining whether the user has an authorization qualification on the target diagnosis function module based on the user information to obtain a determining result; and performing a corresponding operation for acquiring the target diagnosis function module based on the determining result and feeding back the target diagnosis function module to the diagnosis device to cause the diagnosis device to diagnose the vehicle to be diagnosed based on the acquired target diagnosis function module.

It can be seen that the server according to the present disclosure determines whether the user has the authorization qualification on the target diagnosis function module based on the request to obtain a determining result. Only if the user has the authorization qualification, the target diagnosis function module can be downloaded, so that single function module of the diagnosis device can be configured flexibly and the diagnosis device can be configured flexibly based on actual needs of the user to complete vehicle diagnosis, thereby improving usage of diagnosis software and realizing vehicle diagnosis.

BRIEF DESCRIPTION OF THE DRAWINGS

In order to more clearly describe the technical solutions in the embodiments of the present disclosure or the technical solutions in the conventional technology, drawings to be used in the description of the embodiments of the present disclosure or the conventional technology are briefly described hereinafter. It is apparent that the drawings described below show merely the embodiments of the present disclosure, and those skilled in the art may obtain other drawings according to the provided drawings without any creative effort.

DETAILED DESCRIPTION OF EMBODIMENTS

In order to more clearly describe the object, the technical solutions and advantages of the embodiments of the present disclosure, the technical solutions of embodiments of the present disclosure are clearly and completely described below in conjunction with the drawings of the embodiments of the present disclosure. Any other embodiments obtained by those skilled in the art based on the embodiments in the present disclosure without any creative effort fall within the protection scope of the present disclosure.

Figure 1:
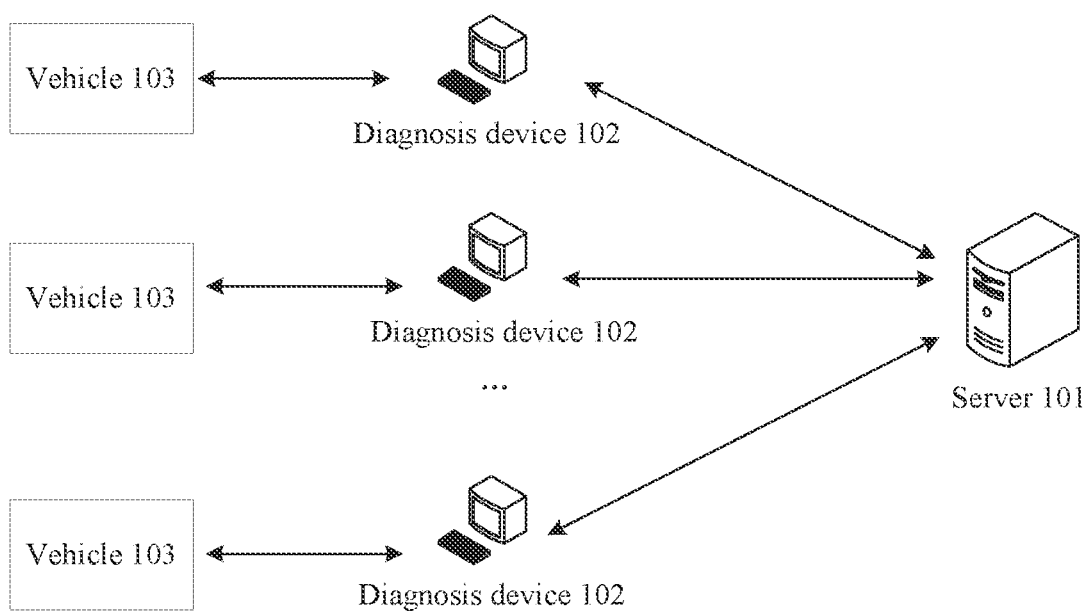
FIG. 1 is a schematic diagram of a system structure of a vehicle diagnosis method according to an embodiment of the present disclosure.

Diagnosis software required in conventional vehicle fault diagnosis is configured by a diagnosis device manufacturer before delivery of the diagnosis device. Alternatively, the diagnosis software is acquired and used by a user after the user gets the device. Conventionally, a diagnosis software package configured by a diagnosis device is generally huge and includes diagnosis software of various mainstream vehicle types. However, in a practical diagnosis process, only one or several diagnosis function modules in diagnosis software is required to diagnose a vehicle. Therefore, a user cannot configure vehicle diagnosis software flexibly and waste of resources exists. Based on the above technical problems, a vehicle diagnosis method is provided according to an embodiment. With the method, a diagnosis device can be configured flexibly based on actuals needs of a user, thereby realizing vehicle diagnosis and reducing waste of resources. Referring to FIG. 1, FIG. 1 is a schematic diagram of a system structure of a vehicle diagnosis method according to an embodiment of the present disclosure.

A vehicle diagnosis system according to the present disclosure includes a server 101, a diagnosis device 102 and a vehicle 103.

The server 101 may include a processor, a memory and the like. The server 101 may connect with the diagnosis device 102 via a communication interface through a communication network to realize data interaction.

The diagnosis device 102 may provide, on a user interface through a client installed in the diagnosis device 102, a user with an input interface for acquiring instructions and a trigger unit for acquiring instructions. The user interface may further include multiple pieces of display and prompt information. It should be noted that the communication network according to the present disclosure may be determined based on a network condition and an application requirement in a practical application. The communication network may be a wireless communication network, such as a mobile communication network or a WIFI network. Alternatively, the communication network may be a wire communication network, for example, a wide area network or a local area network when possible, which is not limited herein.

The vehicle 103 is a vehicle required to be diagnosed, that is, a vehicle to be diagnosed. The vehicle 103 may be a family car or a commercial vehicle. The vehicle 103 includes various electronic control units (ECUs). On the one hand, the ECUs monitor various data when vehicle running. On the other hand, the ECUs exchange vehicle data with the outside, thereby ensuring normal running of the vehicle.

Interaction among the server 101, the diagnosis device 102 and the vehicle 103 is described below. The diagnosis device 102 establishes a connection with the vehicle 103 to be diagnosed and acquires vehicle information. Then the diagnosis device 102 generates a request for acquiring diagnosis software based on a user instruction, where the request includes user information and vehicle information, and sends the request for acquiring the diagnosis software to the server 101. After receiving the request, the server 101 determines a corresponding diagnosis software function module list based on the vehicle information and sends the diagnosis software function module list to the diagnosis device 102. The diagnosis device 102 presents the diagnosis software function module list to the user to cause the user to determine a target diagnosis function module. The diagnosis device 102 sends information of the target diagnosis function module to the server 101 based on user instructions. The server 101 receives the information of the target diagnosis function module and determines whether the user has an authorization qualification on the target diagnosis function module based on the user information to obtain a determining result. Then the server 101 performs a corresponding operation for acquiring the target diagnosis function module based on the determining result and sends the target diagnosis function module to the diagnosis device 102. The diagnosis device 102 receives the operation result fed back by the server 101 and diagnoses the vehicle 103 to be diagnosed based on the acquired target diagnosis function module.

Figure 2:
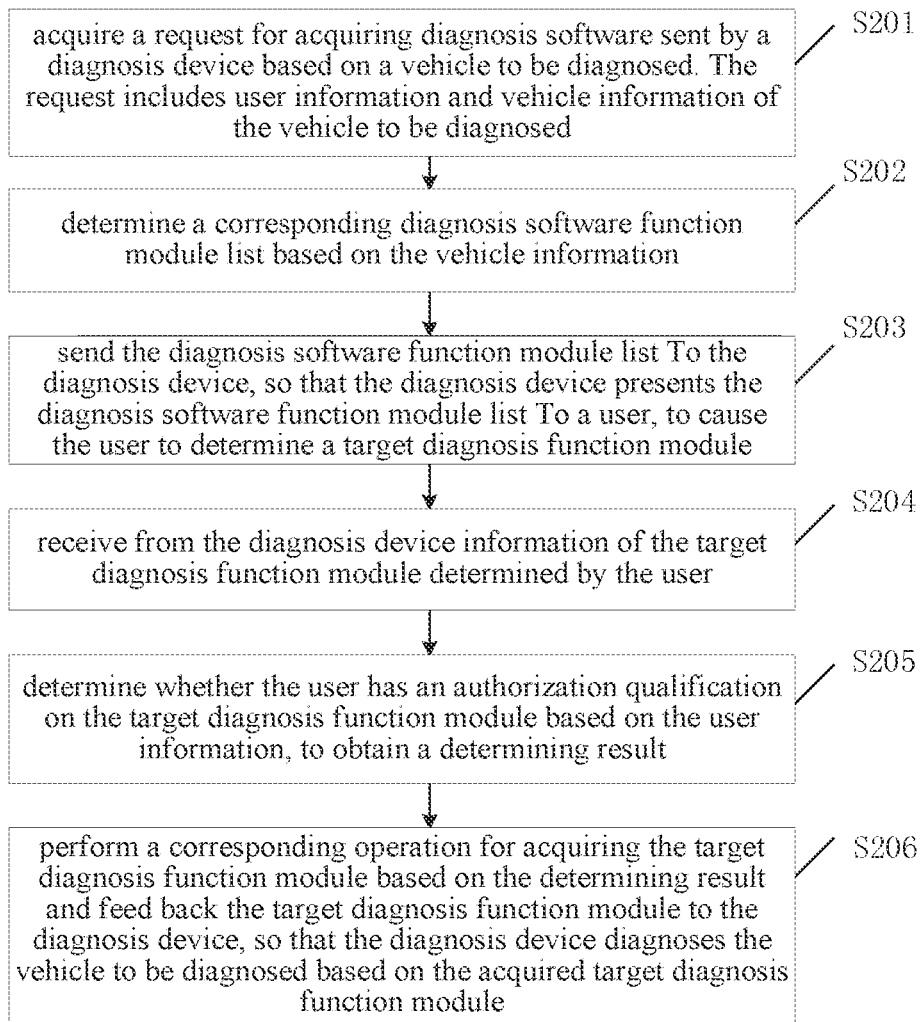
FIG. 2 is a flowchart of a vehicle diagnosis method according to an embodiment of the present disclosure.

Referring to FIG. 2, FIG. 2 is a flowchart of a vehicle diagnosis method according to an embodiment of the present disclosure. The method is mainly applied to a server and the method includes steps S201 to S206.

In step S201, a request for acquiring diagnosis software sent by a diagnosis device based on a vehicle to be diagnosed is acquired. The request includes user information and vehicle information of the vehicle to be diagnosed.

The request is for requesting diagnosis software from a server by a diagnosis device. The request includes user information and vehicle information of the vehicle to be diagnosed. The user information includes but is not limited to information such as a user account, a user cell phone number and a user name. The vehicle information includes but is not limited to a vehicle VIN code, a license plate and a two-dimensional code marking a vehicle exclusively. After acquiring the user information and the vehicle information, the diagnosis device generates the request for acquiring diagnosis software based on the user information and the vehicle information and sends the request to the server.

In step S202, a corresponding diagnosis software function module list is determined based on the vehicle information.

Determining the diagnosis software function module list includes: determining vehicle type information of the vehicle to be diagnosed based on the vehicle information, determining corresponding target diagnosis software based on the vehicle type information and determining the corresponding diagnosis software function module list based on the target diagnosis software. In an embodiment, vehicle type information of the vehicle to be diagnosed is determined based on vehicle information, and thus corresponding target diagnosis software is determined based on the vehicle type information, and a corresponding diagnosis software function module list is obtained based on the target diagnosis software. For example, the vehicle information is a VIN code and it is assumed that the VIN code of the vehicle to be diagnosed is LSGKE5411LW058831, the vehicle type may be determined as Buick Excelle 2019 based on the VIN code and thus the corresponding target diagnosis software is determined as Buick Excelle 2019 diagnosis software. The diagnosis software function modules corresponding to the Buick Excelle 2019 diagnosis software includes health report, system scan, system selection and ADAS calibration. Therefore, a diagnosis function module list of Buick Excelle 2019 diagnosis software may be generated based on the diagnosis function modules.

In step S203, the diagnosis software function module list is sent to the diagnosis device to cause the diagnosis device to present the diagnosis software function module list to a user so as to cause the user to determine target diagnosis function modules.

The server sends the diagnosis software function module list to the diagnosis device. The user determines target diagnosis function modules by selecting on the diagnosis software function module list on a display screen.

In an embodiment, the target diagnosis function module list may be a hierarchical list. For example, the target diagnosis function module list is a multilevel list and a first level list includes but is not limited to health report, system scan, system selection and ADAS calibration. After the user determines "system selection" in the first level list, a second level list corresponding to "system selection" is obtained. The second level list includes but is not limited to ECM, ABS, BCM, BMS, SAS, TCM, SRS, IMM, and TPMS. After the use selects ECM in the second level list, a third level list corresponding to ECM is obtained. The third level list includes but is not limited to read fault code, clear fault code, read data stream, actuation test, special function and programming.

After the user determines ADAS calibration in the first level list, a second level list is obtained. The second level list includes but is not limited to front camera module, ACC module and all-round view module. It may be understood that the user may select multiple module in each level list. The diagnosis software function module lists corresponding to different target diagnosis softwares may be the same or different.

This step is not limited in the embodiment. The user can customize this step as long as the object of the embodiment can be realized.

In step S204, information of the target diagnosis function modules determined by the user is received from the diagnosis device.

After the user determines the target diagnosis function modules, the diagnosis device sends information of the determined target diagnosis function modules to the server.

In step S205, it is determined whether the user has an authorization qualification on the target diagnosis function modules based on the user information, to obtain a determining result.

The server determines whether the user has an authorization qualification on the target diagnosis function modules based on the user information, to obtain a determining result. If the determining result indicates that the user has the authorization qualification, the target diagnosis function modules are sent to the diagnosis device to cause the diagnosis device to configure the target diagnosis function modules. If the determining result indicates that the user does not have the authorization qualification, authorization prompt information is sent to the diagnosis device to cause the user to determine whether to obtain an authorization and the target diagnosis function modules are sent to the diagnosis device after the user obtains the authorization. In this case, the user may diagnose the vehicle based on the diagnosis software in the diagnosis device.

Corresponding diagnosis software authorization information is determined based on the user information. It is determined whether the target diagnosis function modules match the diagnosis software authorization information. If the target diagnosis function modules match the diagnosis software authorization information, it is determined whether the user has an authorization qualification on the target diagnosis function modules, to obtain the determining result.

In an embodiment, the server stores a database of diagnosis software authorization information based on user information in advance. The database of diagnosis software authorization information includes a lot of user information and diagnosis software authorization information and a mapping relationship of the user information and the diagnosis software authorization information is established in advance. One piece of user information may correspond to one piece of diagnosis software authorization information or multiple pieces of diagnosis software authorization information. After receiving a request for acquiring target diagnosis function module, the server may inquire, based on the user information in the request, whether the database includes the user information. If the database includes the user information, corresponding diagnosis software authorization information is determined based on the mapping relationship. For example, in a case that the user information is a user account. After receiving a request for acquiring diagnosis software, the server acquires a user account of the user. After analyzing and determining that the user account is A, the server searches the information database for the user account A. If the user account A exists, corresponding diagnosis software authorization information is determined based on the mapping relationship. If the user account A does not exist, it is determined that the user does not have the authorization qualification on the diagnosis software.

In an embodiment, the request further includes a requested usage period. The diagnosis software authorization information includes authorization diagnosis software information, an authorization diagnosis function module set and an authorization period. Determining whether the target diagnosis function modules match the diagnosis software authorization information includes: determining whether the target diagnosis software matches the authorization diagnosis software information, determining whether the authorization diagnosis function module set includes the target diagnosis function modules if the target diagnosis software matches the authorization diagnosis software information, determining whether the requested usage period is within the authorization period if the authorization diagnosis function module set includes the target diagnosis function modules, and determining that the user has the authorization qualification on the target diagnosis function modules if the requested usage period is within the authorization period. Specifically, it is determined that whether the target diagnosis software information matches the authorization diagnosis software information. If the target diagnosis software information matches the authorization diagnosis software information, it is determined whether the authorization diagnosis function module set includes the target diagnosis function modules. If the authorization diagnosis function module set includes the target diagnosis function modules, it is determined whether the requested usage period is within the authorization period. If the requested usage period is within the authorization period, it is determined that the user has the authorization qualification on the target diagnosis function modules. For example, the request for acquiring diagnosis software includes a user account A and a vehicle VIN code. The request includes a vehicle VIN code LSGKE5411LW05883, a system selection function module and a requested usage period 14:00-18:00 May 25, 2020. It is determined based on the vehicle VIN code that target diagnosis software is Buick Excelle 2019 diagnosis software. Diagnosis software authorization information corresponding to the user account A is determined as follows through query of the server: authorization diagnosis software information is Buick Excelle 2019 diagnosis software, an authorization diagnosis function module set includes health report, system scan, system selection and ADAS calibration and an authorization period is from 19:00 May 24, 2020 to 19:00 May 25, 2020. Then it is determined by analyzing that each of the target diagnosis software and the authorization diagnosis software is Buick Excelle 2019 diagnosis software, thereby determining that the target diagnosis software matches the authorization diagnosis software. Then it is determined by analyzing that the authorization diagnosis function module set includes the system selection function module and the requested usage period is within the authorization period. Therefore, it may be determined that the user has the authorization qualification on the target diagnosis function module. If authorization diagnosis software in diagnosis software authorization information obtained by the server by inquiring based on the user account A is Buick Regal 2019 diagnosis software, the authorization diagnosis function module set includes health report, system scan, system selection and ADAS calibration, and the authorization period is from 8:00 May 25, 2020 to 8:00 May 26, 2020, it is determined by analyzing that the target diagnosis software does not match the authorization diagnosis software information. Therefore, it is determined that the user does not have the authorization qualification on the target diagnosis function module. Alternatively, if authorization diagnosis software in diagnosis software authorization information obtained by the server by inquiring based on the user account A is Buick Excelle 2019 diagnosis software, the authorization diagnosis function module set includes health report, system scan, and ADAS calibration, and the authorization period is from 8:00 May 25, 2020 to 8:00 May 26, 2020, it is determined by analyzing that the target diagnosis software matches the authorization diagnosis software information but the authorization diagnosis function module set does not include the target diagnosis function module. Therefore, it is determined that the user does not have the authorization qualification on the target diagnosis software function module. Alternatively, if authorization diagnosis software in diagnosis software authorization information obtained by the server by inquiring based on the user account A is Buick Excelle 2019 diagnosis software, the authorization diagnosis function module set includes health report, system scan, system selection and ADAS calibration, and the authorization period is from 10:00 May 23, 2020 to 10:00 May 24, 2020, it is determined by analyzing that the target diagnosis software matches the authorization diagnosis software information, the authorization diagnosis function module set includes the target diagnosis function module but the requested usage period is not within the authorization period. Therefore, it is determined that the user does not have the authorization qualification on the target diagnosis function module.

Further, in a case that the user has the authorization qualification on the target diagnosis function modules, the diagnosis device may acquire and use the target diagnosis function modules. If a usage duration exceeds the authorization period, the server sends prompt information to the diagnosis device to remind the user of obtaining an authorization once again.

Based on the above embodiments, taking the user account A and the vehicle VIN code LSGKE5411LW05883 as an example, the user may acquire the system selection function module for use through the diagnosis device after it is determined that the vehicle corresponding to the user account A has an authorization qualification on the system selection function module. If the user desires to use the target diagnosis software from 14:00 May 25, 2020 to 20:00 May 25, 2020, the authorization period from 19:00 May 24, 2020 to 19:00 May 25, 2020 has been exceeded when the user uses the target diagnosis software until 19:01 May 25, 2020. In this case, the server determines that the usage period of the target diagnosis function module has exceeded the authorization period. Then the server sends prompt information to the diagnosis device to remind the user of obtaining an authorization once again. A manner in which the user obtains an authorization once again includes but is not limited to purchase, periodic lease and transfer. If the user obtains an authorization once again, the diagnosis device is permitted to keep using the system selection function module. If the user does not obtain an authorization once again, the diagnosis device is stopped from using the system selection function module.

In step S206, a corresponding operation for acquiring the target diagnosis function modules is performed based on the determining result and the target diagnosis function modules are fed back to the diagnosis device to cause the diagnosis device to diagnose the vehicle to be diagnosed based on the acquired target diagnosis function modules.

If the determining result indicates that the user has the authorization qualification, the target diagnosis function module is sent to the diagnosis device to cause the diagnosis device to configure the target diagnosis function modules.

If the determining result indicates that the user does not have the authorization qualification, authorization prompt information is sent to the diagnosis device to cause the user to determine whether to obtain an authorization and the target diagnosis function modules are sent to the diagnosis device after the user obtains the authorization.

Based on the above embodiments, in a case that the request includes a user account A and a vehicle VIN code LSGKE5411LW05883 and the server determines that the user has an authorization qualification on a target diagnosis function module that is a Buick Excelle 2019 system selection function module, a software package of the system selection function module is sent to the diagnosis device to cause the diagnosis device to configure and install the target diagnosis function module. If the server determines that the vehicle does not have the authorization qualification on the Buick Excelle 2019 system selection function module, prompt information such as "You do not have an authorization qualification on the Buick Excelle 2019 system selection function module, please obtain an authorization" is sent to the diagnosis device to remind the user of obtaining an authorization. When the user determines to obtain an authorization, a manner of obtaining an authorization is provided, which is convenient for the user to handle an authorization. A manner of obtaining the authorization qualification includes but is not limited to purchase, periodic lease, loan and transfer. After the user selects one of the manners and obtains an authorization, the server generates a piece of new target diagnosis function module authorization information based on the authorization result and stores the generated target diagnosis function module authorization information in a diagnosis software authorization information database. In addition, the server sends a corresponding target diagnosis function module to the diagnosis device based on the authorization obtained by the user to cause the diagnosis device to configure and use the target diagnosis function module.

Based on the above technical solutions, the server according to the embodiment determines whether the user has the authorization qualification on the target diagnosis function module based on the request to obtain a determining result. Only if the user has the authorization qualification, the target diagnosis function module can be downloaded, so that single function module of the diagnosis device can be configured flexibly and the diagnosis device can be configured flexibly based on actual needs of the user to complete vehicle diagnosis, thereby improving usage of the diagnosis function module and realizing vehicle diagnosis.

Figure 3:
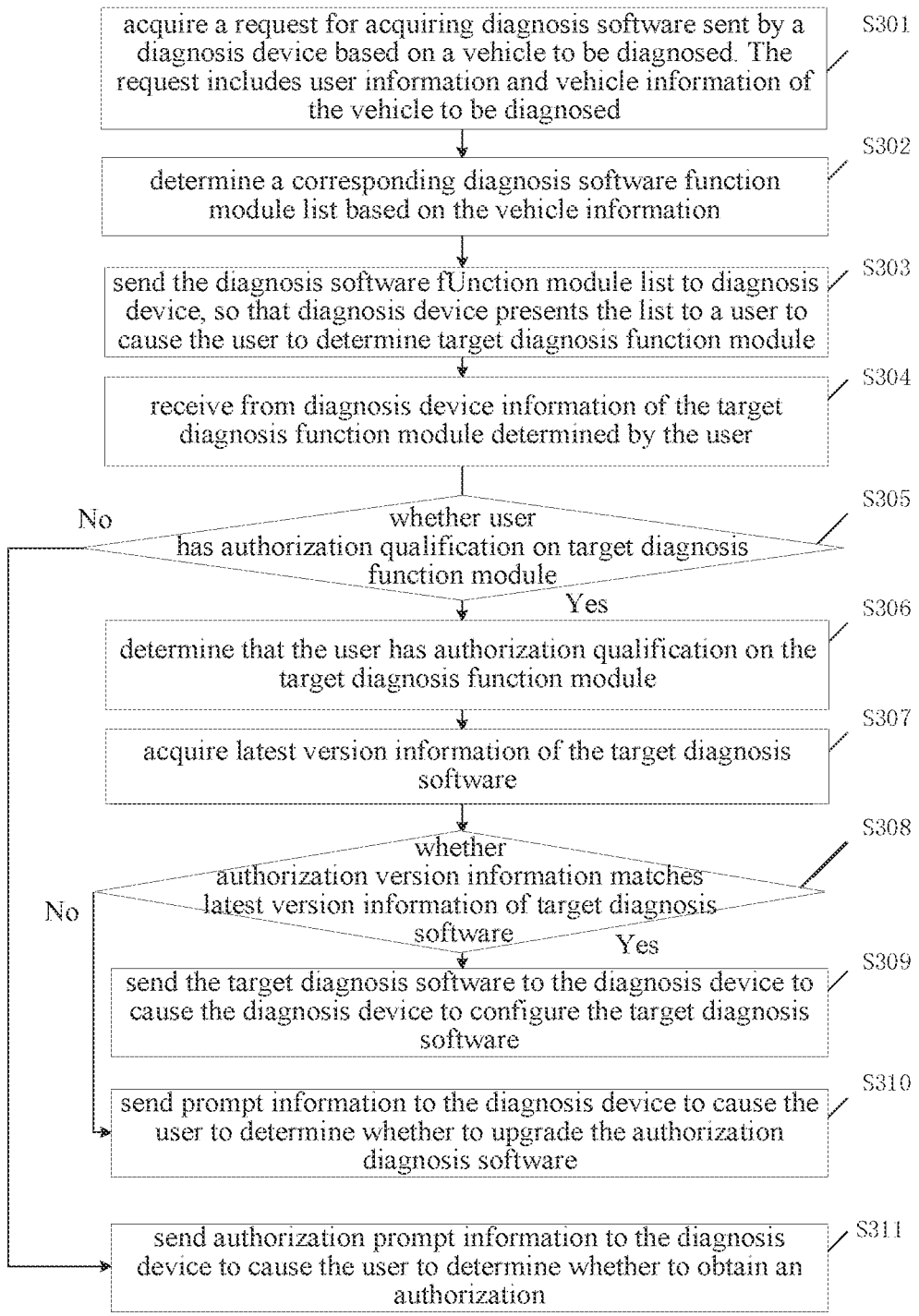
FIG. 3 is a flowchart of another vehicle diagnosis method according to an embodiment of the present disclosure.

FIG. 3 is a flowchart of another vehicle diagnosis method according to an embodiment of the present disclosure. The method is mainly applied to a server. The method includes steps S301 to S311.

In step S301, a request for acquiring diagnosis software sent by a diagnosis device based on a vehicle to be diagnosed is acquired. The request includes user information and vehicle information of the vehicle to be diagnosed.

Step S301 is the same as step S201 and details of steps S301 are not repeated herein.

In step S302, a corresponding diagnosis software function module list is determined based on the vehicle information.

Step S302 is the same as step S202 and details of steps S302 are not repeated herein.

In step S303, the diagnosis software function module list is sent to the diagnosis device to cause the diagnosis device to present the diagnosis software function module list to a user so as to cause the user to determine a target diagnosis function module.

Step S303 is the same as step S203 and details of steps S303 are not repeated herein.

In step S304, information of the target diagnosis function modules determined by the user is received from the diagnosis device.

Step S304 is the same as step S204 and details of steps S304 are not repeated herein.

In step S305, it is determined whether the user has an authorization qualification on the target diagnosis function modules.

In a case that the target diagnosis software matches the authorization diagnosis software information, the authorization diagnosis function module set includes the target diagnosis function modules and the user requested usage period is within the authorization period, it is determined that the user has the authorization qualification on the target diagnosis function module.

If the user has the authorization qualification, step S306 is performed. If it is not matched, step S311 is performed.

In step S306, it is determined that the user has the authorization qualification on the target diagnosis function module.

In step S307, latest version information of the target diagnosis software is acquired.

The server may acquire the latest version information of the target diagnosis software from a diagnosis software library.

In step S308, it is determined whether the authorization version information matches the latest version information of the target diagnosis software.

If the authorization version information matches the latest version information of the target diagnosis software, step S309 is performed. If the authorization version information does not match the latest version information of the target diagnosis software, step S310 is performed.

The diagnosis software authorization information further includes authorization version information. It may be determined whether the authorization version information matches the latest version information of the acquired target diagnosis software by comparing whether the authorization version information is the same as the latest version information of the acquired target diagnosis software. Based on the above embodiments, it is determined based on the vehicle VIN code LSGKE5411LW058831 that the target diagnosis software is Buick Excelle 2019 diagnosis software. In addition, it is determined based on the user account A that the authorization diagnosis software is also the Buick Excelle 2019 diagnosis software and an authorization version is V2.0. In a case that the latest version information of the target software acquired from the diagnosis software library in the server is Buick Excelle 2019 diagnosis software V2.0, it is determined that the authorization version information matches the latest version information of the target diagnosis software because the latest version information is the same as the authorization version information. In a case that the latest version information of the target software acquired from the diagnosis software library in the server is Buick Excelle 2019 diagnosis software V3.0, it is determined that the authorization version information does not match the latest version information of the target diagnosis software because the latest version information is not the same as the authorization version information.

In step S309, the target diagnosis software is sent to the diagnosis device to cause the diagnosis device to configure the target diagnosis software.

If it is determined that the latest version information matches the authorization version information, the server sends the target diagnosis function modules to the diagnosis device to cause the diagnosis device to install and use the target diagnosis function module. It can be understood that the target diagnosis software includes various target diagnosis function modules.

In step S310, prompt information is sent to the diagnosis device to cause the user to determine whether to upgrade the authorization diagnosis software.

If it is determined that the latest version information does not match the authorization version information, for example, in a case that the latest version information of the target diagnosis software acquired by the server is Buick Excelle 2019 diagnosis software V3.0 but the authorization diagnosis software is Buick Excelle 2019 diagnosis software V2.0, the server sends prompt information such as "Your authorization diagnosis software is in a low version, whether to upgrade the authorization diagnosis software to a latest version" to the diagnosis device to cause the user to determine whether to upgrade the authorization diagnosis software.

Further, in a case that the user determines to upgrade, the diagnosis device sends an upgrade request to the server based on a user instruction. When receiving the upgrade request, the server determines whether the diagnosis software authorization information includes an upgrade permission. If the diagnosis software authorization information includes the upgrade permission, the server sends the target diagnosis software with the latest version to the diagnosis device to cause the diagnosis device to configure the target diagnosis software and update authorization version information of the authorization diagnosis software. If the diagnosis software authorization information does not include the upgrade permission, the server sends upgrade prompt information to the diagnosis device to remind the user of obtaining the upgrade permission.

If the user determines to upgrade, the server determines whether the user has the upgrade permission after receiving the upgrade request sent by the diagnosis. If it is determined that the user has the upgrade permission, the server sends the target diagnosis function module with the latest version, for example, Buick Excelle 2019 system selection function module V3.0, to the diagnosis device to cause the diagnosis device to install and configure the function module. In addition, the server updates the diagnosis software authorization information to be Buick Excelle 2019 diagnosis software V3.0. If it is determined that the user does not have the upgrade permission, the server sends upgrade prompt information such as "You do not have an upgrade permission, please obtain the upgrade permission and then upgrade the software" to the diagnosis device to remind the user of obtaining the upgrade permission. After the user obtains the upgrade permission, a target diagnosis function module of the target diagnosis software with the lasted version is sent to the diagnosis device and authorization version information in the diagnosis software authorization information is updated. If the user does not agree to obtain the upgrade permission, the target diagnosis function module of the authorization diagnosis software is sent to the diagnosis device and version information of the authorization diagnosis software is not updated.

In step S311, authorization prompt information is sent to the diagnosis device to cause the user to determine whether to obtain an authorization.

For step S311, one may refer to operations in a case that the user does not have the authorization qualification in step S206, and details of step S311 are not repeated herein.

In the embodiment, after determining that the user has the authorization qualification on the target diagnosis function module based on the user information and the vehicle information, the server may further cause the user to acquire the target diagnosis software with the latest version by comparing whether the latest version of the target diagnosis software is the same as the authorization version and reminding the user of upgrading in a case that the latest version of the target diagnosis software is not the same as the authorization version, thereby improving user experience.

Figure 4:
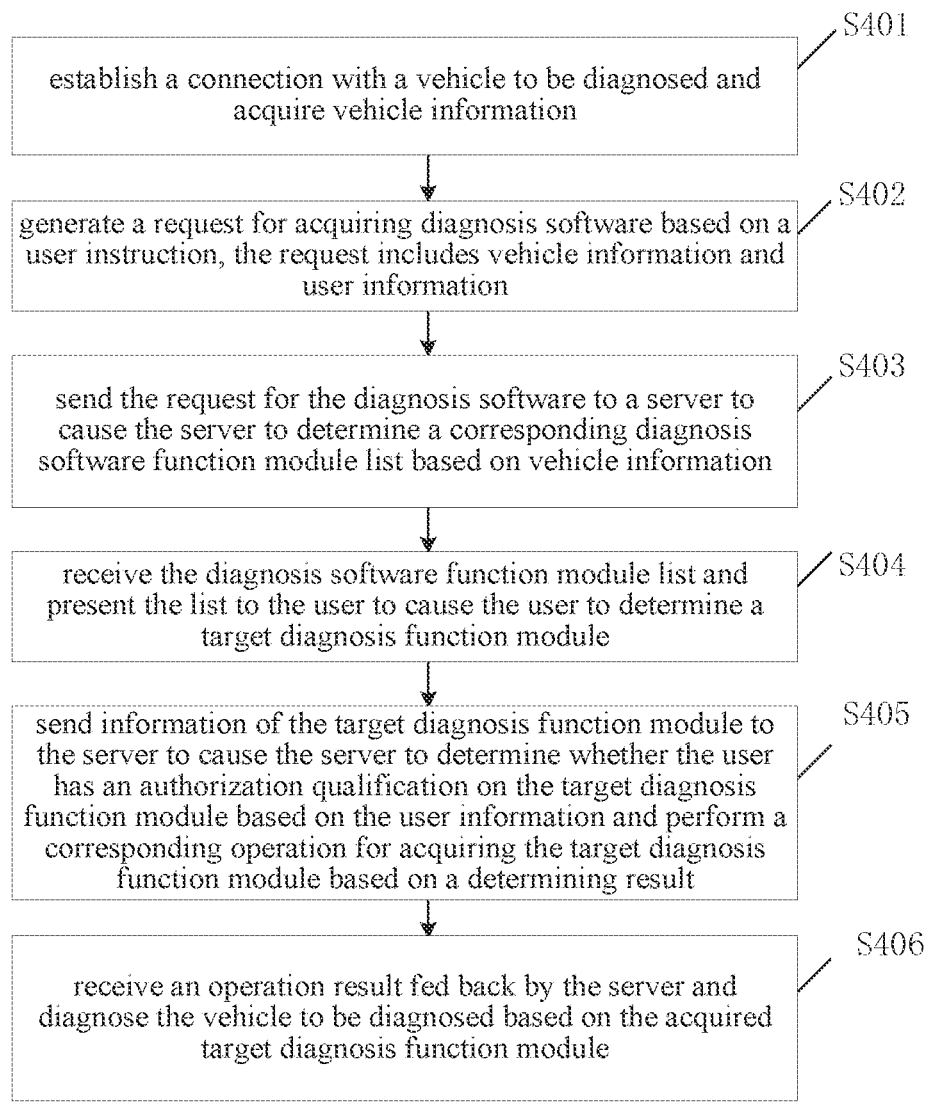
FIG. 4 is a flowchart of another vehicle diagnosis method according to an embodiment of the present disclosure.

FIG. 4 is a flowchart of another vehicle diagnosis method according to an embodiment of the present disclosure. The method is applied to a diagnosis device. The diagnosis device may be a terminal with a function of loading diagnosis software and performing vehicle diagnosis, such as a handheld device, a mobile terminal and a personal digital assistant. The method includes steps S401 to S406.

In step S401, a connection with a vehicle to be diagnosed is established and vehicle information is acquired.

In step S402, a request for acquiring diagnosis software is generated based on a user instruction. The request includes the vehicle information and user information.

The request is for requesting diagnosis software from a server by a diagnosis device. The request includes user information and vehicle information of the vehicle to be diagnosed. The user information includes but is not limited to information such as a user account, a user cell phone number and a user name. Information of the vehicle to be diagnosed is vehicle information obtained after the diagnosis device establishes a connection with the vehicle to be diagnosed. The vehicle information includes but is not limited to a vehicle VIN code, a license plate and a two-dimensional code marking a vehicle exclusively.

In step S403, the request for acquiring the diagnosis software is sent to a server to cause the server to determine a corresponding diagnosis software function module list based on the vehicle information.

In step S404, the diagnosis software function module list is received and presented to the user to cause the user to determine target diagnosis function modules.

In step S405, information of the target diagnosis function modules is sent to the server to cause the server to determine whether the user has an authorization qualification on the target diagnosis function modules based on the user information and perform a corresponding operation for acquiring the target diagnosis function modules based on a determining result.

In step S406, an operation result fed back by the server is received and the vehicle to be diagnosed is diagnosed based on the acquired target diagnosis function module.

If the determining result indicates that the user has the authorization qualification, the method further includes:
receiving authorization diagnosis software upgrade prompt information sent by the server and presenting the authorization diagnosis software upgrade prompt information to the user to cause the user to determine whether to upgrade,
sending an upgrade request to the server if the user determines to upgrade, to cause the server to determine whether the user has an upgrade permission, receiving and configuring the target diagnosis function module with a latest version sent by the server if the server determines that the user has the upgrade permission, receiving an upgrade permission prompt sent by the server if the server determines that the user does not have the upgrade permission and presenting the upgrade permission prompt to the user to remind the user of obtaining the upgrade permission, and
receiving and configuring the target diagnosis function modules sent by the server if the user determines not to upgrade.

In an embodiment, the request for acquiring diagnosis software includes user information and vehicle information. After the request is sent by a diagnosis device to a server, the server acquires authorization diagnosis software information based on the user information, determines a diagnosis software function module list based on the vehicle information and sends the diagnosis software function module list to the diagnosis device to cause a user to determine target diagnosis function modules. Then the server determines whether the target diagnosis software function modules match the authorization diagnosis software information. If the target diagnosis software function modules match the authorization diagnosis software information, it is determined that the user has an authorization qualification on the target diagnosis software function modules. In another embodiment, the request for acquiring diagnosis software includes user information, vehicle information and a requested usage period. After the request is sent by a diagnosis device to a server, the server acquires authorization diagnosis software information and an authorization period based on the user information, determines a diagnosis software function module list based on the vehicle information and sends the diagnosis software function module list to the diagnosis device to cause a user to determine target diagnosis function modules. Then the server determines whether the target diagnosis software function modules match the authorization diagnosis software information. If the target diagnosis software function modules match the authorization diagnosis software information, it is determined whether the requested usage period is within the authorization period. If the requested usage period is within the authorization period, it is determined that the user has an authorization qualification on the target diagnosis software function modules. In this case, the server sends the target diagnosis function modules to the diagnosis device. If the requested usage period is not within the authorization period, it is determined that the user does not have an authorization qualification on the target diagnosis software function modules. In this case, the server sends authorization prompt information to the diagnosis device to remind the user of obtaining an authorization. For the process of acquiring the target diagnosis function modules by the server and the process of determining whether the target diagnosis software function modules match the authorization diagnosis software information, one may refer to the above descriptions in embodiments of the server and details of the processes are not repeated herein.

In a case that the determining result indicates that the user has the authorization qualification, the diagnosis device receives and configures the target diagnosis function modules sent by the server and then uses the target diagnosis function modules. In a case that the determining result indicates that the user does not have the authorization qualification, the diagnosis device receives authorization prompt information sent by the server and presents the authorization prompt information to the user to cause the user to determine whether to obtain an authorization.

Taking a user account A and a vehicle VIN code LSGKE54111W058831 acquired by the diagnosis device as an example. After the diagnosis device generates a request for acquiring diagnosis software based on the user account and the vehicle VIN code and sends the request to the server, the server determines a diagnosis software function module list based on the vehicle VIN code and sends the diagnosis software function module list to the diagnosis device. The diagnosis device receives the diagnosis software function module list including health report, system scan, system selection and ADAS calibration sent by the server and presents the diagnosis software function module list to the user. After the user determines the system selection diagnosis function module, the diagnosis device sends information of the system selection diagnosis function module to the server. If the server determines that the user has the authorization qualification, the diagnosis device receives the system selection diagnosis function module sent by the server. If the server does not have the authorization qualification, the diagnosis device receives prompt information "You do not have an authorization qualification on Buick Excelle 2019 system selection diagnosis function module, please obtain an authorization" sent by the server. If the user determines to obtain the authorization, an interface of the diagnosis device displays multiple manner of obtaining the authorization, such as purchase, periodic lease, loan and transfer. After the user selects one of the manners and obtains an authorization, the server sends a target diagnosis function module corresponding to the authorization to the diagnosis device to cause the diagnosis device to configure and use the target diagnosis function module.

After the diagnosis device acquires the target diagnosis function module, the diagnosis device receives an authorization expiring prompt such as "Your authorization on the diagnosis software has expired, please obtain an authorization once again" sent by the server if a usage duration exceeds the authorization period in use. The prompt may be received when usage time just exceeds expiration time of the authorization period. Alternatively, the prompt may be received at a time before the expiration time of the authorization term by a predetermined time period threshold. For example, the prompt may be received at a time 30 min before the expiration time of the authorization period. The prompt time is not limited herein. If the user determines to obtain an authorization once again through the diagnosis device, the diagnosis device keeps using the target diagnosis function module after the user obtains the authorization once again. If the user does not obtain the authorization once again, the diagnosis device is stopped from using the target diagnosis function module.

If the determining result indicates that the user has the authorization qualification, the diagnosis device receives authorization diagnosis software upgrade prompt information sent by the server and presents the authorization diagnosis software upgrade prompt information to the user to cause the user to determine whether to upgrade. If the user determines to upgrade, an upgrade request is sent to the server to cause the server to determine whether there is an upgrade permission. If the server determines that there is an upgrade permission, the diagnosis device receives and configures the target diagnosis function module with a latest version sent by the server. If the server determines that there is no upgrade permission, the diagnosis device receives an upgrade permission prompt sent by the server and presents the upgrade permission prompt to the user to remind the user of obtaining the upgrade permission. If the user determines not to upgrade, the diagnosis device receives and configures the target diagnosis function module sent by the server.

If the determining result indicates that there is an authorization qualification, the server determines whether the authorization version information matches the latest version information of the acquired target software by comparing whether the authorization version information is the same as the latest version information of the acquired target software. If the latest version information matches the authorization version information, the diagnosis device receives the target diagnosis function module sent by the server and configures and uses the target diagnosis function module. If the latest version information does not match the authorization version information, the diagnosis device receives an upgrade prompt such as "Your authorization diagnosis software is in a low version, whether to upgrade the authorization diagnosis software to a latest version" sent by the server and presents the upgrade prompt to the user. If the user determines to upgrade, the diagnosis device sends an upgrade request to the server based on a user instruction to cause the server to determine whether the diagnosis software authorization information includes an upgrade permission. In a case that the diagnosis software authorization information includes the upgrade permission, the diagnosis device receives the target diagnosis function module with the latest version sent by the server and configures and uses the target diagnosis function module. In a case that the diagnosis software authorization information does not include the upgrade permission, the diagnosis device receives prompt information for obtaining upgrade permission such as "You do not have an upgrade permission, please obtain the upgrade permission and then upgrade software" sent by the server and presents the prompt information to the user. After the user determines to obtain the upgrade permission and after the upgrade permission is obtained, the diagnosis device receives the target diagnosis function module with the latest version sent by the server and configures and uses the target diagnosis function module. If the user determines not to obtain the upgrade permission, the diagnosis device acquires the diagnosis function module in the authorization diagnosis software and configures and uses the diagnosis function module.

In the embodiment, the diagnosis device configures and uses the diagnosis software based on the user information and the vehicle information, so that the diagnosis device can be configured flexibly and usage of the diagnosis software is high, thereby completing vehicle diagnosis well and leading to better user experience.

Figure 5:
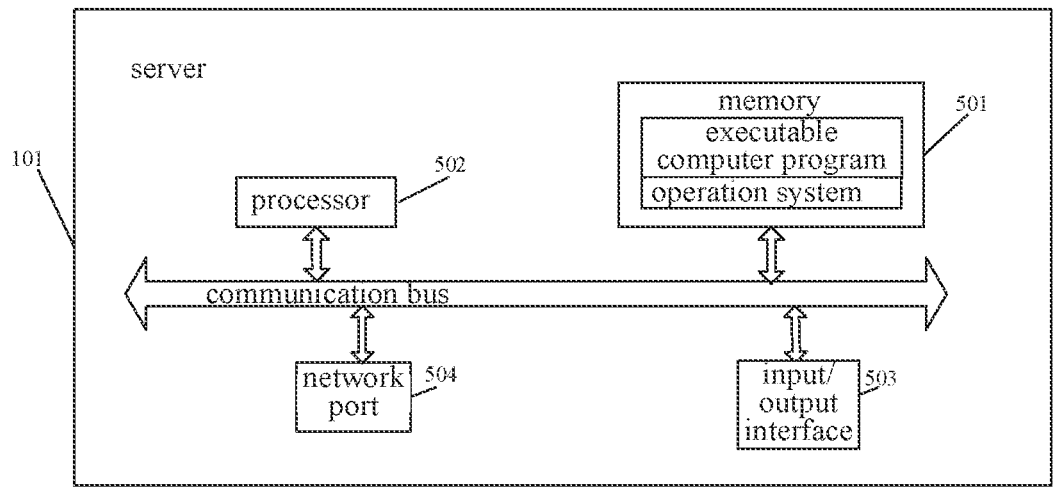
FIG. 5 is a schematic structural diagram of a server according to an embodiment of the present disclosure.

A server according to an embodiment of the present disclosure is described below. Referring to FIG. 5, FIG. 5 is a schematic structural diagram of a server according to an embodiment of the present disclosure. The server includes a memory 501, a processor 502, an input/output interface 503 and a network port 504. The memory 501 includes a nonvolatile storage medium and an internal memory. The nonvolatile storage medium stores an operation system and computer readable instructions. The internal memory provides an environment for running of the operation system and the computer readable instructions in the nonvolatile storage medium. The processor 502 may be a central processing unit (CPU), a general processor, a digital signal processor (DSP), an application specific integrated circuit (ASIC), a field-programmable gate array (FPGA), a programmable logic device, a discrete gate or transistor logic device, a discrete hardware component, or the like. The general processor may be a microprocessor or any conventional processor. The processor 502 provides computing and control capability for the server 101, and executes the computer program stored in the memory 501 to implement steps of the vehicle diagnosis method. The input/output interface 503 is configured to acquire a computer program, a parameter and instructions that are externally imported. The acquired computer program, parameter and instructions are controlled by the processor 502 to be stored in the memory 501. The input/output interface 503 may be connected with an input device to receive a parameter or instructions manually entered by a user. The input device may be a touch layer covering a display screen, or a button, a trackball or a touchpad provided on a terminal shell, or a keyboard, a touchpad or a mouse. In the embodiment, the user may start the vehicle diagnosis method through the input/output interface 503. The network port 504 is configured to implement a communication connection with various external terminal devices. The communication technology used for the communication connection includes a wired communication technology or a wireless communication technology, such as a mobile high definition link (MHL), an universal serial bus (USB), a high definition multimedia interface (HDMI), a wireless fidelity (WiFi) technology, a bluetooth communication technology, a low power bluetooth communication technology, and a communication technology based on IEEE802.11s. In the embodiment, under a normal networking condition, authentication may be achieved through interaction between the network port 504 and the diagnosis device 102.

The memory 501 is configured to store an executable computer program.

The processor 502 is configured to call the executable computer program to: acquire a request for acquiring diagnosis software sent by a diagnosis device based on a vehicle to be diagnosed, where the request includes user information and vehicle information of the vehicle to be diagnosed; determine a corresponding diagnosis software function module list based on the vehicle information; send the diagnosis software function module list to the diagnosis device, so that the diagnosis device presents the diagnosis software function module list to a user to cause the user to determine a target diagnosis function module; receive the from the diagnosis device information of the target diagnosis function module determined by the user; determine whether the user has an authorization qualification on the target diagnosis function module based on the user information to obtain a determining result; perform a corresponding operation for acquiring the target diagnosis function module based on the determining result and feedback the target diagnosis function module to the diagnosis device, so that the diagnosis device diagnoses the vehicle to be diagnosed based on the acquired target diagnosis function module.

Based on the above technical solutions, the server according to the embodiment determines whether the user has the authorization qualification on the target diagnosis function module based on the request to obtain a determining result. Only if the user has the authorization qualification, the target diagnosis function module can be downloaded. In this way, single function module of the diagnosis device can be configured flexibly and the diagnosis device can be configured flexibly based on actual needs of the user to complete vehicle diagnosis, thereby improving usage of diagnosis software.

Preferably, the processor 502 is further configured to call the executable computer program to: determine vehicle type information of the vehicle to be diagnosed based on the vehicle information; determine corresponding target diagnosis software based on the vehicle type information; and determine the corresponding diagnosis software function module list based on the target diagnosis software.

Preferably, the processor 502 is further configured to call the executable computer program to: determine corresponding diagnosis software authorization information based on the user information; determine whether the target diagnosis function module matches the diagnosis software authorization information; and determine whether the user has an authorization qualification on the target diagnosis function module to obtain a determining result if the target diagnosis function module matches the diagnosis software authorization information.

Preferably, the processor 502, the request further includes a requested usage period. The diagnosis software authorization information includes authorization diagnosis software information, an authorization diagnosis function module set and an authorization period. The processor is further configured to call the executable computer program to: determine whether the target diagnosis software matches the authorization diagnosis software information; determine whether the authorization diagnosis function module set includes the target diagnosis function module if the target diagnosis software matches the authorization diagnosis software information; determine whether the requested usage period is within the authorization period if the authorization diagnosis function module set includes the target diagnosis function module; and determine that the user has the authorization qualification on the target diagnosis function module if the requested usage period is within the authorization period.

Preferably, the processor 502, the diagnosis software authorization information further includes authorization version information. The processor is further configured to call the executable computer program to: acquire latest version information of the target diagnosis software; determine whether the authorization version information matches the latest version information of the target diagnosis software; and send, if the authorization version information does not match the latest version information of the target diagnosis software, prompt information to the diagnosis device to cause the user to determine whether to upgrade the authorization diagnosis software.

Preferably, the processor 502 is further configured to call the executable computer program to: determine whether the diagnosis software authorization information includes an upgrade permission when an upgrade request sent by the diagnosis device is received; send the target diagnosis function module with a latest version to the diagnosis device if the diagnosis software authorization information includes the upgrade permission, to cause the diagnosis device to configure the target diagnosis function module and update authorization version information of the authorization diagnosis software; and send upgrade prompt information to the diagnosis device if the diagnosis software authorization information does not include the upgrade permission, to remind the user of obtaining the upgrade permission.

Preferably, the processor 502 is further configured to call the executable computer program to: send the target diagnosis function module to the diagnosis device if the determining result indicates that the user has the authorization qualification, to cause the diagnosis device to configure the target diagnosis function module; and send authorization prompt information to the diagnosis device if the determining result indicates that the user does not have the authorization qualification, to cause the user to determine whether to obtain an authorization and send the target diagnosis function module to the diagnosis device after the user obtains the authorization.

Since embodiments of the server correspond to the embodiments of the vehicle diagnosis method, therefore for the embodiments of the server, one may refer to descriptions in the embodiments of the vehicle diagnosis method, and details are not repeated herein.

Figure 6:
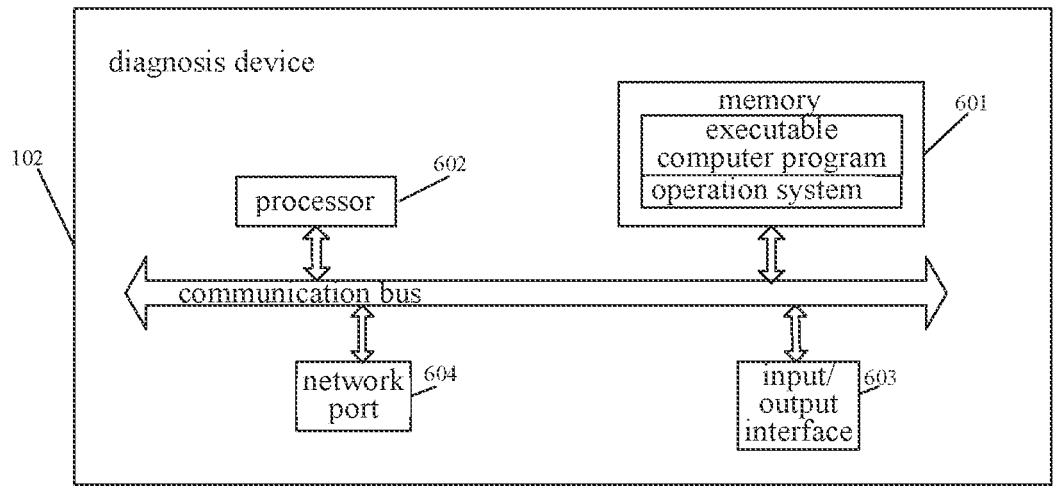
FIG. 6 is a schematic structural diagram of a diagnosis device according to an embodiment of the present disclosure.

Referring to FIG. 6, FIG. 6 is a schematic structural diagram of a diagnosis device according to an embodiment of the present disclosure. The diagnosis device includes a memory 601, a processor 602, an input/output interface 603 and a network port 604.

The memory 601 includes a nonvolatile storage medium and an internal memory. The nonvolatile storage medium stores an operation system and computer readable instructions. The internal memory provides an environment for running of the operation system and the computer readable instructions in the nonvolatile storage medium. The processor 602 may be a central processing unit (CPU), a general processor, a digital signal processor (DSP), an application specific integrated circuit (ASIC), a field-programmable gate array (FPGA), a programmable logic device, a discrete gate or transistor logic device, a discrete hardware component, or the like. The general processor may be a microprocessor or any conventional processor. The processor 602 provides technology and a control capability for the diagnosis device 102, and executes the computer program stored in the memory 601, to implement steps of the method for acquiring vehicle diagnosis software. The input/output interface 603 is configured to acquire a computer program, a parameter and instructions that are externally imported. The acquired program, parameter and instructions are controlled by the processor 602 to be stored in the memory 601.

The input/output device may be a touch screen, a keyboard, a touchpad or a mouse. The input/output interface 603 is configured to acquire a computer program, a parameter and instructions that are externally imported. The acquired program, parameter and instructions are controlled by the processor 602 to be stored in the memory 601. The input/output interface 603 may be connected with an input device to receive a parameter or instructions manually entered by a user. The input device may be a touch layer covering a display screen, or a button, a trackball or a touchpad provided in a terminal shell, or a keyboard, a touchpad or a mouse. In the embodiment, the user may start the vehicle diagnosis method through the input/output interface 603. The network port 604 is configured to implement a communication connection with various external terminal devices. The communication technology used for the communication connection includes a wired communication technology or a wireless communication technology, such as a mobile high definition link (MHL), an universal serial bus (USB), a high definition multimedia interface (HDMI), a wireless fidelity (WiFi) technology, a bluetooth communication technology, a low power bluetooth communication technology, and a communication technology based on IEEE802.1s. In the embodiment, under a normal networking condition, authentication may be achieved through interaction between the network port 604 and the server 101.

The memory 601 is configured to store an executable computer program.

The processor 602 is configured to call the executable computer program to: establish a connection with a vehicle to be diagnosed and acquire vehicle information, generate a request for acquiring diagnosis software based on a user instruction, where the request includes the vehicle information and user information; send the request for acquiring the diagnosis software to a server to cause the server to determine a corresponding diagnosis software function module list based on the vehicle information; receive the diagnosis software function module list and present the diagnosis software function module list to the user to cause the user to determine a target diagnosis function module; send information of the target diagnosis function module to the server to cause the server to determine whether the user has an authorization qualification on the target diagnosis function module based on the user information and perform a corresponding operation for acquiring the target diagnosis function module based on a determining result; and receive an operation result fed back by the server and diagnose the vehicle to be diagnosed based on the acquired target diagnosis function module.

Based on the above technical solutions, the server according to the embodiment determines whether the user has an authorization qualification on the target diagnosis function module based on the request to obtain a determining result. Only if the user has the authorization qualification, the target diagnosis function module can be downloaded. In this way, single function module of the diagnosis device can be configured flexibly and the diagnosis device can be configured flexibly based on actual needs of the user to complete vehicle diagnosis, thereby improving usage of diagnosis function module.

Preferably, the processor 602 is further configured to call the executable computer program to: receive the target diagnosis function module sent by the server if the determining result indicates that the user has the authorization qualification and configure the target diagnosis function module; and receive authorization prompt information sent by the server if the determining result indicates that the user does not have the authorization qualification and present the authorization prompt information to the user to cause the user to determine whether to obtain an authorization.

Preferably, the processor 602 is further configured to call the executable computer program to: receive authorization diagnosis software upgrade prompt information sent by the server and present the authorization diagnosis software upgrade prompt information to the user to cause the user to determine whether to upgrade; send an upgrade request to the server if the user determines to upgrade, to cause the server to determine whether the user has an upgrade permission, and receive and configure the target diagnosis function module with a latest version sent by the server if the server determines that the user has the upgrade permission; and receive an upgrade permission prompt sent by the server if the server determines that the user does not have the upgrade permission and present the upgrade permission prompt to the user to remind the user of obtaining the upgrade permission; and receive and configure the target diagnosis function module sent by the server if the user determines not to upgrade.

Since embodiments of the diagnosis device correspond to the embodiments of the vehicle diagnosis method, therefore for the embodiments of the diagnosis device, one may refer to descriptions in the embodiments of the vehicle diagnosis method, and the details are not repeated herein.

Embodiments in this specification are described in a progressive way, each of which emphasizes the differences from others, and for the same or similar parts among the embodiments, one may refer to description of other embodiments. Since the device disclosed in the embodiments corresponds to the method disclosed in the embodiments, the description thereof is relatively simple, and for relevant matters, one may refer to the description of the method embodiments.

It should be further understood by those skilled in the art that units and algorithm steps described in combination with the disclosed embodiments may be implemented by electronic hardware, computer software or a combination thereof. In order to clearly describe interchangeability of the hardware and the software, the components and steps are generally described above based on functions. Whether the functions are realized by the hardware or the software is determined by specific applications of the technical solutions and design constraints. For each of the specific applications, those skilled in the art may adopt a specific implementation to realize the functions described above, and the implementation should fall within the scope of the present disclosure.

In combination with the embodiments herein, steps of the method or algorithm described may be directly implemented using hardware, a software module executed by a processor, or the combination thereof. The software module can be embedded in a random access memory (RAM), an internal storage, a read only memory (ROM), an electrically programmable ROM, an electrically erasable programmable ROM, a register, a hard disk, an removable disk, a CD-ROM or any other form of storage medium known in the art.

The vehicle diagnosis method, the server and the diagnosis device according to the present disclosure are described in detail above. Specific examples are used in the application to explain principles and embodiments of the present disclosure. The above descriptions of embodiments are merely used to help in understanding the method and the core idea of the present disclosure. It should be noted that various variations and modifications of the present disclosure can be made by those skilled in the art without departing from the spirit of the preset disclosure and such variations and modifications are within the protection scope of the claims of the present disclosure.

The invention claimed is:

1. A vehicle diagnosis method applied to a server, comprising:
    acquiring a request for acquiring diagnosis software sent by a diagnosis device based on a vehicle to be diagnosed, wherein the request comprises user information and vehicle information of the vehicle to be diagnosed;
    determining a corresponding diagnosis software function module list based on the vehicle information;
    sending the diagnosis software function module list to the diagnosis device, so that the diagnosis device presents the diagnosis software function module list to a user, to determine a target diagnosis function module;

receiving, from the diagnosis device, information of the target diagnosis function module determined by the user selecting from the diagnosis software function module list;
determining whether the user has an authorization qualification on the target diagnosis function module based on the user information, to obtain a determining result; and
performing a corresponding operation for acquiring the target diagnosis function module based on the determining result and feeding back the target diagnosis function module to the diagnosis device, so that the diagnosis device diagnoses the vehicle to be diagnosed based on the acquired target diagnosis function module.

2. The vehicle diagnosis method according to claim 1, wherein the determining a corresponding diagnosis software function module list based on the vehicle information, comprises:
determining vehicle type information of the vehicle to be diagnosed based on the vehicle information;
determining corresponding target diagnosis software based on the vehicle type information; and
determining the corresponding diagnosis software function module list based on the target diagnosis software.

3. The vehicle diagnosis method according to claim 2, wherein the determining whether the user has an authorization qualification on the target diagnosis function module based on the user information to obtain a determining result, comprises:
determining corresponding diagnosis software authorization information based on the user information;
determining whether the target diagnosis function module matches the diagnosis software authorization information; and
if the target diagnosis function module matches the diagnosis software authorization information, determining whether the user has an authorization qualification on the target diagnosis function module to obtain the determining result.

4. The vehicle diagnosis method according to claim 3, wherein
the request further comprises a requested usage period;
the diagnosis software authorization information comprises authorization diagnosis software information, an authorization diagnosis function module set and an authorization period;
the determining whether the target diagnosis function module matches the diagnosis software authorization information comprises:
determining whether the target diagnosis software matches the authorization diagnosis software information;
determining whether the authorization diagnosis function module set comprises the target diagnosis function module if the target diagnosis software matches the authorization diagnosis software information;
determining whether the requested usage period is within the authorization period if the authorization diagnosis function module set comprises the target diagnosis function module; and
determining that the user has the authorization qualification on the target diagnosis function module if the requested usage period is within the authorization period.

5. The vehicle diagnosis method according to claim 3, wherein the diagnosis software authorization information further comprises authorization version information, and after it is determined that the user has the authorization qualification on the target diagnosis function module, the method further comprises:
acquiring latest version information of the target diagnosis software;
determining whether the authorization version information matches the latest version information of the target diagnosis software; and
sending, if the authorization version information does not match the latest version information of the target diagnosis software, prompt information to the diagnosis device to cause the user to determine whether to upgrade the authorization diagnosis software.

6. The vehicle diagnosis method according to claim 5, further comprising:
determining whether the diagnosis software authorization information comprises an upgrade permission when an upgrade request sent by the diagnosis device is received;
sending the target diagnosis function module with a latest version to the diagnosis device, so that the diagnosis device configures the target diagnosis function module and updates authorization version information of the authorization diagnosis software, if the diagnosis software authorization information comprises the upgrade permission; and
sending upgrade prompt information to the diagnosis device to remind the user of obtaining the upgrade permission, if the diagnosis software authorization information does not comprise the upgrade permission.

7. The vehicle diagnosis method according to claim 1, wherein the performing a corresponding operation for acquiring the target diagnosis function module based on the determining result, comprises:
sending, if the determining result indicates that the user has the authorization qualification, the target diagnosis function module to the diagnosis device to cause the diagnosis device to configure the target diagnosis function module; and
sending, if the determining result indicates that the user does not have the authorization qualification, authorization prompt information to the diagnosis device to cause the user to determine whether to obtain an authorization and sending the target diagnosis function module to the diagnosis device after the user obtains the authorization.

8. A vehicle diagnosis method applied to a diagnosis device, comprising:
establishing a connection with a vehicle to be diagnosed and acquiring vehicle information;
generating a request for acquiring diagnosis software based on a user instruction, wherein the request comprises the vehicle information and user information;
sending the request for acquiring the diagnosis software to a server to cause the server to determine a corresponding diagnosis software function module list based on the vehicle information;
receiving the diagnosis software function module list and presenting the diagnosis software function module list to the user, to determine a target diagnosis function module;
sending information of the target diagnosis function module determined by the user selecting from the diagnosis software function module list to the server to cause the server to determine whether the user has an authorization qualification on the target diagnosis function module based on the user information and perform a corresponding operation for acquiring the target diagnosis function module based on a determining result; and receiving an operation result fed back by the server and diagnosing the vehicle to be diagnosed based on the acquired target diagnosis function module.

9. The vehicle diagnosis method according to claim 8, further comprising:

receiving, if the determining result indicates that the user has the authorization qualification, the target diagnosis function module sent by the server and configuring the target diagnosis function module; and receiving, if the determining result indicates that the user does not have the authorization qualification, authorization prompt information sent by the server and presenting the authorization prompt information to the user to cause the user to determine whether to obtain an authorization.

10. The vehicle diagnosis method according to claim 9, wherein if the determining result indicates that the user has the authorization qualification, the method further comprises:

receiving authorization diagnosis software upgrade prompt information sent by the server and presenting the authorization diagnosis software upgrade prompt information to the user to cause the user to determine whether to upgrade;

sending an upgrade request to the server if the user determines to upgrade, to cause the server to determine whether there is an upgrade permission, receiving and configuring the target diagnosis function module with a latest version sent by the server if the server determines that there is the upgrade permission; and receiving an upgrade permission prompt sent by the server if the server determines that there is no upgrade permission and presenting the upgrade permission prompt to the user to remind the user of obtaining the upgrade permission; and receiving and configuring the target diagnosis function module sent by the server if the user determines not to upgrade.

11. A diagnosis device, comprising:

a memory configured to store an executable computer program;

a processor configured to call the executable computer program to perform steps of the vehicle diagnosis method applied to a diagnosis device according to claim 8.

12. The diagnosis device according to claim 11, wherein the processor is further configured to call the executable computer program to:

receive the target diagnosis function module sent by the server and configure the target diagnosis function module, if the determining result indicates that the user has the authorization qualification; and receive authorization prompt information sent by the server if the determining result indicates that the user does not have the authorization qualification, and present the authorization prompt information to the user to cause the user to determine whether to obtain an authorization.

13. The diagnosis device according to claim 12, wherein the processor is further configured to call the executable computer program to:

receive authorization diagnosis software upgrade prompt information sent by the server and present the authorization diagnosis software upgrade prompt information to the user to cause the user to determine whether to upgrade;

send an upgrade request to the server if the user determines to upgrade, to cause the server to determine whether there is an upgrade permission, receive and configure the target diagnosis function module with a latest version sent by the server if the server determines that there is the upgrade permission; and receive an upgrade permission prompt sent by the server if the server determines that there is no upgrade permission, and present the upgrade permission prompt to the user to remind the user of obtaining the upgrade permission; and receive and configure the target diagnosis function module sent by the server if the user determines not to upgrade.

14. A server, comprising:

a memory configured to store an executable computer program;

a processor configured to call the executable computer program to:

acquire a request for acquiring diagnosis software sent by a diagnosis device based on a vehicle to be diagnosed, wherein the request comprises user information and vehicle information of the vehicle to be diagnosed;

determine a corresponding diagnosis software function module list based on the vehicle information;

send the diagnosis software function module list to the diagnosis device, so that the diagnosis device presents the diagnosis software function module list to a user, to determine a target diagnosis function module;

receive from the diagnosis device information of the target diagnosis function module determined by the user selecting from the diagnosis software function module list;

determine whether the user has an authorization qualification on the target diagnosis function module based on the user information to obtain a determining result; and perform a corresponding operation for acquiring the target diagnosis function module based on the determining result and feedback the target diagnosis function module to the diagnosis device, so that the diagnosis device diagnoses the vehicle to be diagnosed based on the acquired target diagnosis function module.

15. The server according to claim 14, wherein the processor is further configured to call the executable computer program to:

determine vehicle type information of the vehicle to be diagnosed based on the vehicle information;

determine corresponding target diagnosis software based on the vehicle type information; and determine the corresponding diagnosis software function module list based on the target diagnosis software.

16. The server according to claim 15, wherein the processor is further configured to call the executable computer program to:

determine corresponding diagnosis software authorization information based on the user information;

determine whether the target diagnosis function module matches the diagnosis software authorization information; and determine whether the user has an authorization qualification on the target diagnosis function module to obtain the determining result, if the target diagnosis function module matches the diagnosis software authorization information.

17. The server according to claim 16, wherein
the request further comprises a requested usage period;
the diagnosis software authorization information comprises authorization diagnosis software information, an authorization diagnosis function module set and an authorization period;
the processor is further configured to call the executable computer program to:
determine whether the target diagnosis software matches the authorization diagnosis software information;
determine whether the authorization diagnosis function module set comprises the target diagnosis function module if the target diagnosis software matches the authorization diagnosis software information;
determine whether the requested usage period is within the authorization period if the authorization diagnosis function module set comprises the target diagnosis function module; and
determine that the user has the authorization qualification on the target diagnosis function module if the requested usage period is within the authorization period.

18. The server according to claim 16, wherein
the diagnosis software authorization information further comprises authorization version information;
the processor is further configured to call the executable computer program to:
acquire latest version information of the target diagnosis software;
determine whether the authorization version information matches the latest version information of the target diagnosis software; and
send, if the authorization version information does not match the latest version information of the target diagnosis software, prompt information to the diagnosis device to cause the user to determine whether to upgrade the authorization diagnosis software.

19. The server according to claim 18, wherein the processor is further configured to call the executable computer program to:
determine whether the diagnosis software authorization information comprises an upgrade permission when an upgrade request sent by the diagnosis device is received;
send the target diagnosis function module with a latest version to the diagnosis device if the diagnosis software authorization information comprises the upgrade permission, so that the diagnosis device configures the target diagnosis function module and updates authorization version information of the authorization diagnosis software; and
send upgrade prompt information to the diagnosis device if the diagnosis software authorization information does not comprise the upgrade permission, to remind the user of obtaining the upgrade permission.

20. The server according to claim 14, wherein the processor is further configured to call the executable computer program to:
send the target diagnosis function module to the diagnosis device if the determining result indicates that the user has the authorization qualification, to cause the diagnosis device to configure the target diagnosis function module; and
send authorization prompt information to the diagnosis device if the determining result indicates that the user does not have the authorization qualification, to cause the user to determine whether to obtain an authorization and sending the target diagnosis function module to the diagnosis device after the user obtains the authorization.

* * * * *